United States Patent
Lane

(12) 
(10) Patent No.: US 9,211,040 B2
(45) Date of Patent: Dec. 15, 2015

(54) FOOD STORAGE CONTAINER WITH QUICK ACCESS LID

(71) Applicant: Marvin Lane, Wheeling, IL (US)

(72) Inventor: Marvin Lane, Wheeling, IL (US)

(73) Assignee: THERMOS L.L.C., Schaumburg, IL (US)

( * ) Notice: Subject to any disclaimer, the term of this patent is extended or adjusted under 35 U.S.C. 154(b) by 81 days.

(21) Appl. No.: 13/847,577

(22) Filed: Mar. 20, 2013

(65) Prior Publication Data

US 2013/0248531 A1 Sep. 26, 2013

Related U.S. Application Data

(60) Provisional application No. 61/614,552, filed on Mar. 23, 2012, provisional application No. 61/695,681, filed on Aug. 31, 2012.

(51) Int. Cl.

| B65D 51/18 | (2006.01) |
|---|---|
| B65D 39/00 | (2006.01) |
| B65D 45/16 | (2006.01) |
| A47J 47/02 | (2006.01) |
| A45C 11/20 | (2006.01) |

(Continued)

(52) U.S. Cl.
CPC .............. *A47J 47/02* (2013.01); *A45C 11/20* (2013.01); *B65B 43/38* (2013.01); *B65D 43/22* (2013.01); *B65D 43/26* (2013.01); *A45F 3/16* (2013.01); *B65D 47/0828* (2013.01); *B65D 2543/00564* (2013.01); *B65D 2543/00972* (2013.01); *B65D 2543/00981* (2013.01)

(58) Field of Classification Search
CPC .... B65D 47/08; B65D 43/16; B65D 47/0828; A45F 3/16; A45F 3/18

USPC .......... 220/326, 337, 324, 262, 254.5, 254.1, 220/715, 847, 849, 848, 833; 222/472, 505, 222/506, 508, 545; 215/286, 285, 237; 206/524.8; 16/386, 267, 319

See application file for complete search history.

(56) References Cited

U.S. PATENT DOCUMENTS

| 1,324,869 A | * | 12/1919 | Wolfermann .................. 215/235 |
| 1,441,641 A | * | 1/1923 | Thompson .................... 215/289 |

(Continued)

FOREIGN PATENT DOCUMENTS

| JP | 2010-023854 | 2/2010 |
| KR | 10-2011-0055816 | 5/2011 |

OTHER PUBLICATIONS

Korean Patent No. 10-2013-0065514 Notice of Grounds for Rejection mailed Jul. 28, 2014 (with translation) (5 pages).

*Primary Examiner* — Mickey Yu
*Assistant Examiner* — Gideon Weinerth
(74) *Attorney, Agent, or Firm* — Polsinelli PC

(57) ABSTRACT

A food jar has an insulated body with a wide-mouth opening for receiving food. A collar is affixed to the opening of the food jar by affixing a throat member to the collar and threading the throat into the wide-mouth body. The throat member includes a gasket at the lower end to seal the throat to the body. A lid is affixed to the collar by a hinge. The lid includes a central projection that extends into sealing contact with the gasket on the throat member to seal the lid to the throat member. A button is mounted in a channel in the lid and biased by a spring to move into an engaging position to engage the collar at an opening in the collar to secure the lid to the collar. A wire loop is provided to engage the button in an embodiment.

13 Claims, 18 Drawing Sheets

(51) Int. Cl.
   *B65B 43/38*   (2006.01)
   *B65D 43/22*   (2006.01)
   *B65D 43/26*   (2006.01)
   *B65D 47/08*   (2006.01)
   *A45F 3/16*   (2006.01)

(56) References Cited

U.S. PATENT DOCUMENTS

| | | | | |
|---|---|---|---|---|
| 1,503,187 | A * | 7/1924 | Fitchett | 220/326 |
| 1,629,747 | A * | 5/1927 | Stathes et al. | 220/203.1 |
| 2,142,636 | A * | 1/1939 | Evensen | 220/291 |
| 2,594,467 | A * | 4/1952 | Lynch, Jr. et al. | 222/542 |
| 2,737,189 | A * | 3/1956 | Morningstar et al. | 132/305 |
| 4,483,355 | A * | 11/1984 | Yuhara | 132/301 |
| 5,203,468 | A * | 4/1993 | Hsu | 220/254.3 |
| 5,238,138 | A * | 8/1993 | Bois | 220/830 |
| 5,282,541 | A * | 2/1994 | Chen | 215/229 |
| 5,300,748 | A * | 4/1994 | Colombo | 219/734 |
| 5,320,232 | A * | 6/1994 | Maguire et al. | 215/245 |
| 5,385,257 | A * | 1/1995 | Hung | 220/324 |
| 5,738,238 | A * | 4/1998 | Yang | 220/324 |
| 6,050,441 | A * | 4/2000 | Kuo | 220/324 |
| 6,105,809 | A * | 8/2000 | Yamanaka | 220/326 |
| 6,116,476 | A * | 9/2000 | Huang | 222/506 |
| 6,253,947 | B1 * | 7/2001 | Yang | 220/324 |
| 6,279,773 | B1 * | 8/2001 | Kiyota | 220/709 |
| D451,023 | S * | 11/2001 | Kitamura et al. | D9/449 |
| D455,611 | S * | 4/2002 | Kitamura et al. | D7/608 |
| 6,609,624 | B2 * | 8/2003 | Goto et al. | 220/259.1 |
| 6,702,137 | B1 * | 3/2004 | Kowa et al. | 220/254.5 |
| 6,786,332 | B1 * | 9/2004 | Patrick et al. | 206/305 |
| D528,862 | S * | 9/2006 | Li | D7/510 |
| D529,339 | S * | 10/2006 | Carreno et al. | D7/511 |
| D533,061 | S * | 12/2006 | Li | D9/443 |
| D560,435 | S * | 1/2008 | Meehan et al. | D7/510 |
| D579,772 | S * | 11/2008 | Williams | D9/446 |
| D608,640 | S * | 1/2010 | Carreno | D9/449 |
| D609,964 | S * | 2/2010 | Lane | D7/392.1 |
| D634,972 | S * | 3/2011 | Staton | D7/392.1 |
| 7,931,052 | B2 * | 4/2011 | Schooley | 141/65 |
| D639,660 | S * | 6/2011 | Carreno | D9/504 |
| 8,141,731 | B2 * | 3/2012 | Mazurkiewicz et al. | 215/237 |
| D661,945 | S * | 6/2012 | Eyal | D7/392.1 |
| 8,292,101 | B1 * | 10/2012 | Bragg et al. | 215/237 |
| 8,397,940 | B2 * | 3/2013 | Steininger | 220/714 |
| D679,959 | S * | 4/2013 | Lane | D7/629 |
| 8,540,121 | B2 * | 9/2013 | Walters et al. | 222/182 |
| D690,559 | S * | 10/2013 | Lane | D7/510 |
| 8,550,269 | B2 * | 10/2013 | Lane | 215/229 |
| 8,622,229 | B2 * | 1/2014 | Lane | 215/305 |
| 8,689,989 | B2 * | 4/2014 | Lane | 215/237 |
| 2002/0036207 | A1 * | 3/2002 | Ohuo et al. | 220/830 |
| 2002/0170874 | A1 * | 11/2002 | Hou | 215/229 |
| 2004/0217139 | A1 * | 11/2004 | Roth et al. | 224/148.7 |
| 2005/0161463 | A1 * | 7/2005 | Litchman | 220/787 |
| 2007/0205176 | A1 * | 9/2007 | Karp | 215/237 |
| 2012/0012589 | A1 * | 1/2012 | Smyers | B65D 21/0219 220/378 |
| 2012/0312816 | A1 * | 12/2012 | Barreto | B65D 43/022 220/254.7 |
| 2012/0312832 | A1 * | 12/2012 | Lane | 220/833 |
| 2013/0319966 | A1 * | 12/2013 | Lane | 215/237 |
| 2014/0166654 | A1 * | 6/2014 | Lane | 220/262 |
| 2014/0175042 | A1 * | 6/2014 | Lane | 215/229 |

\* cited by examiner

FOOD STORAGE CONTAINER WITH QUICK ACCESS LID

CROSS-REFERENCE TO RELATED APPLICATION

This application is claims the benefit of U.S. Provisional Patent Application Ser. No. 61/614,552, filed Mar. 23, 2012, and U.S. Provisional Patent Application Ser. No. 61/695,651, filed Aug. 31, 2012, which are both incorporated herein by reference.

BACKGROUND OF THE INVENTION

1. Field of the Invention

The present invention relates generally to a food storage container, and more particularly to food storage container having a lid that is latched in as closed position and released by a push button.

2. Description of the Related Art

Insulated food storage containers are frequently used to transport food items in a cold or hot state for school and work lunches, for parties or picnics, for home-bound persons, or other occasions. Many such insulated food storage containers have lids that dose by threading the lid into or onto the insulated container. This requires manipulation of the lid and the container, which may be a challenge for young children, disabled persons, or the elderly, particularly if the container is of the wide-mouth variety having a large diameter lid. A small child, a person with arthritis, or a person who has lost full use of both hands as a result of a stroke, for example, will find it difficult to grasp and hold the container while grasping and twisting the lid. The threads on the container and lid can become fouled by food particles and present a challenge during cleaning.

SUMMARY OF THE INVENTION

The present invention provides an insulated food storage container with a closable lid that can be opened by operating a release button to provide access to the interior of the container and any food held therein. The release button includes a spring-biased push button on the lid that releases a catch or latch. A catch projection or latch projection in the lid engages a strike in the container when the lid is in the closed and latched position. The catch preferably extends into an opening in the container to engage the strike.

When the release button is pressed, the catch projection disengages the strike and the lid may be opened. A spring cushion between the lid and container may have sufficient spring force to cause the lid to pop open, at least somewhat, when the release button is pressed. The lid is attached to the container by a hinge so that it can be swung open to provide access to the interior of the container. The lid is closed by swinging it to a closed position and pressing down until the catch projection engages the strike.

The insulated food container is easily opened and closed by using the hinge and push button. Persons for whom a large diameter threaded lid and container might present a challenge are able to use the present container without difficulty.

A second embodiment of the food container has a securing latch that prevents inadvertent release of the release button in a preferred embodiment, the securing latch serves a dual purpose, first, to secure the lid in the closed position even if the release button is not holding the lid in the closed position and, second, to prevent the release button from being inadvertently pushed to a release position.

DETAILED DESCRIPTION OF THE PREFERRED EMBODIMENTS

Figure 1:
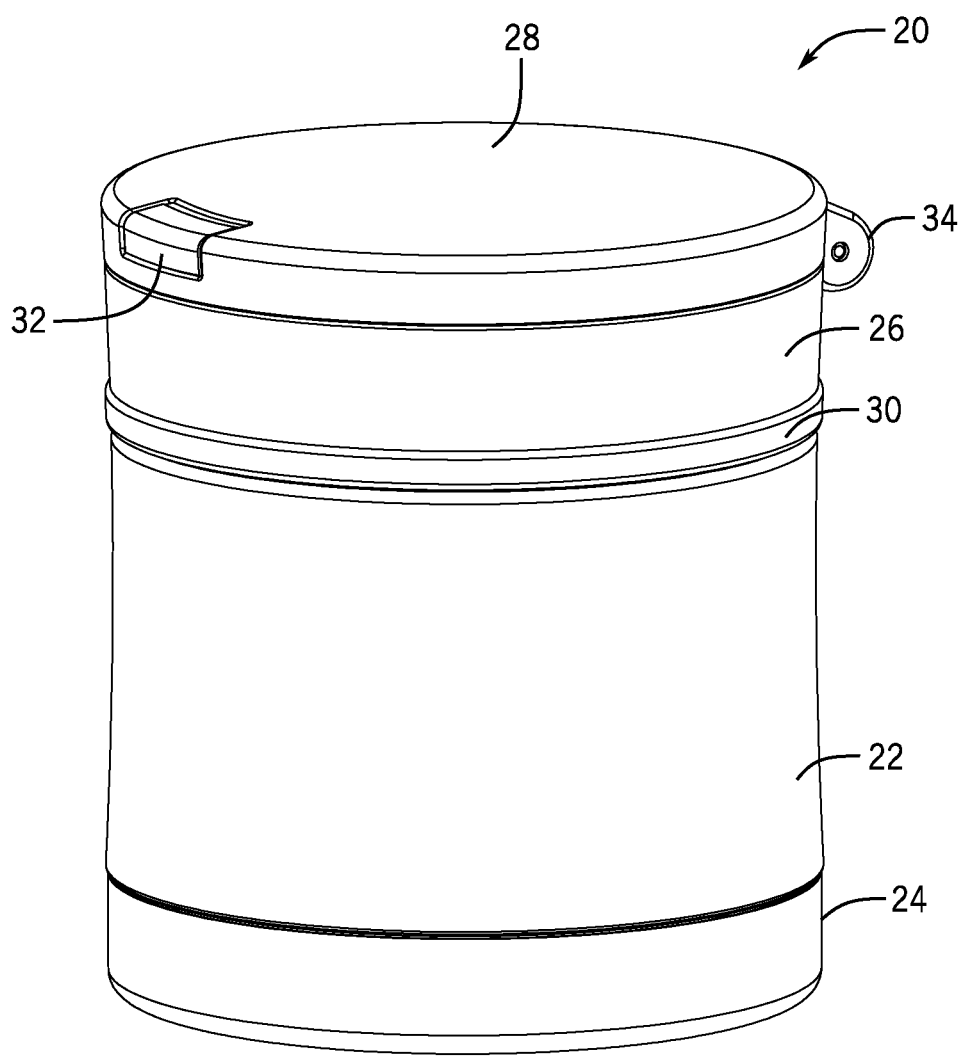
FIG. 1 is a front perspective view showing an insulated food storage container and lid according to the principles of the present invention.

The insulated food storage container 20 is shown in FIG. 1. The container 20 includes an insulated container body 22, a base 24 affixed to the body 22 on which the body rests when place upright on a surface, and a collar 26 mounted on the top of the body 22 opposite the base 24. A lid 28 is secured to the collar 26 to close the container 20 and enclose food items stored within the container. The lid 28, collar 26, body 22 and base 24 form a substantially cylindrical structure with generally smooth sides. A slight flaring of the base 24 to provide a wider base, a ring 30 at the body 22 and collar 26 junction and slight curving of the sides depart from the overall cylindrical shape. Of course, other configurations of food storage container are within the scope or this invention. The container 20 need not be insulated in all embodiments.

The lid 28 has a release button 32 at a top, front edge that is shaped as a continuation of the cylindrical shape of the lid 28.

Opposite the release button 32 is a hinge 34 that pivotally connects the lid 28 to the container 20.

Figure 2:
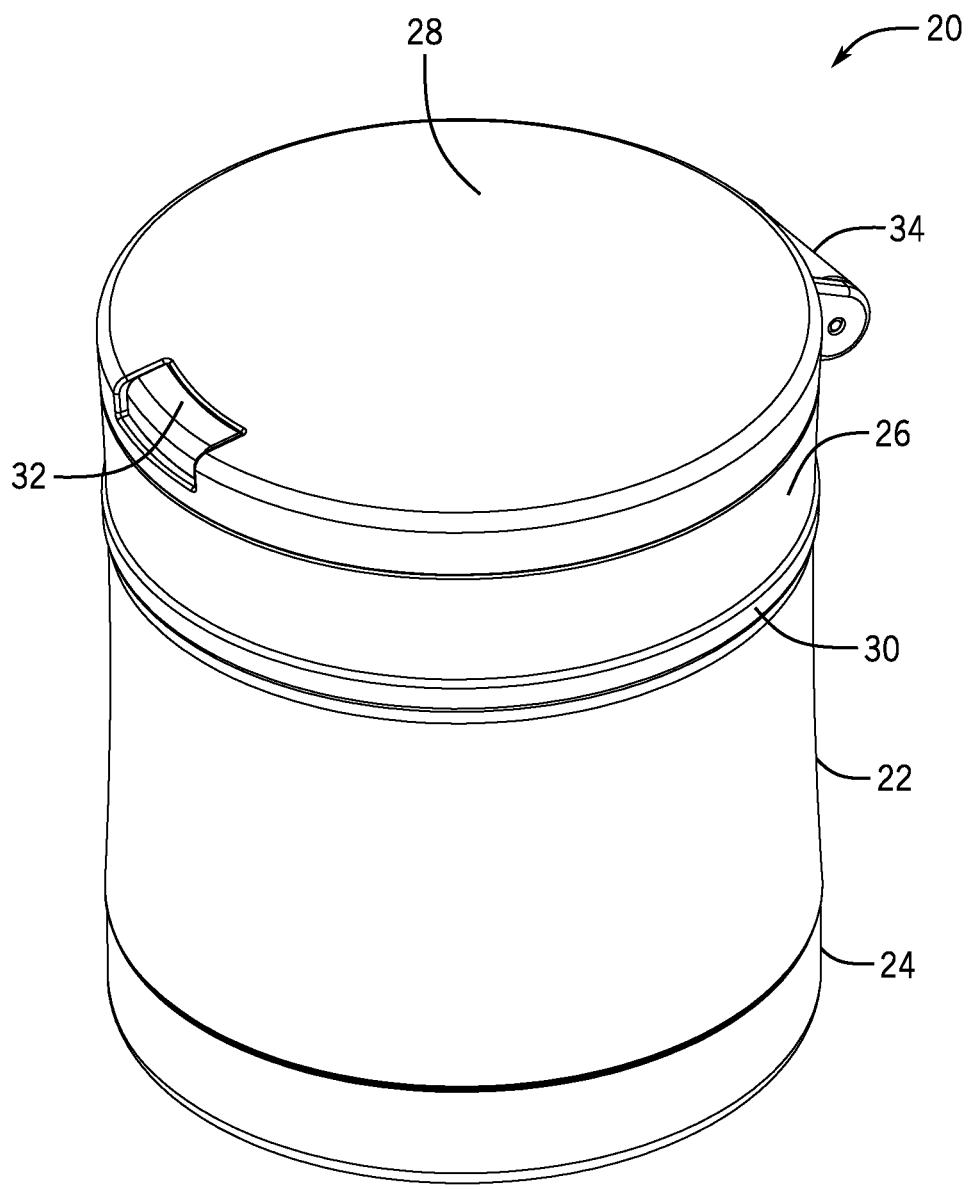
FIG. 2 is a top perspective view of the insulated food storage container.

In FIG. 2, the cylindrical configuration of the container 20 and lid 28 is apparent. The release button 32 has been pressed inward, such as by a user exerting a force by pressing with a finger on the release button to cause the button 32 to slide inwardly in a radially inward direction in the lid 28. The release button 32 slides toward the center of the lid 28 when moved to the release position. The shape of the release button 32 as a continuation of the lid shape reduces the chance that the button will be pressed inadvertently, such as during transport of the food container 20.

Figure 3:
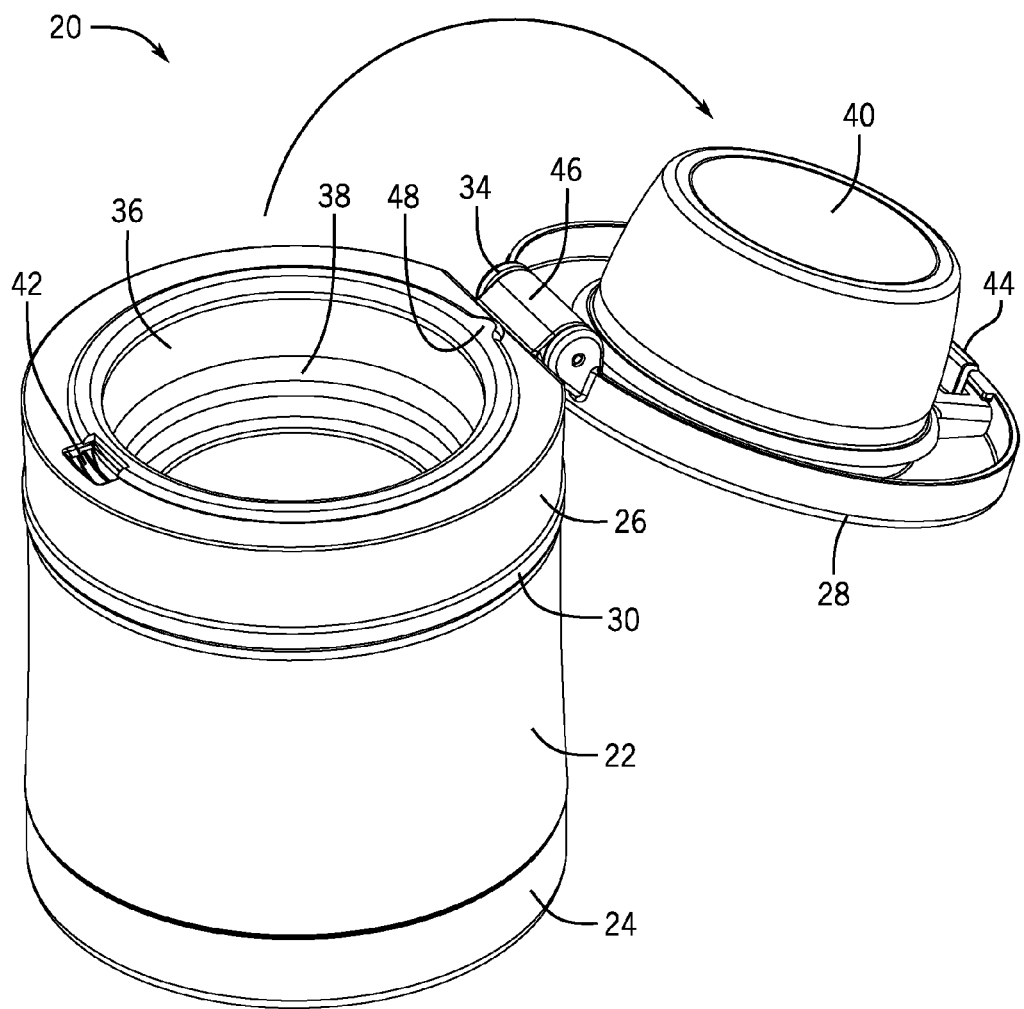
FIG. 3 is a top perspective view of the food storage container with the lid in an open position.

FIG. 3 is a view of the insulated food storage container 20 with the lid 28 in an open position. The container 20 can still rest on the base 24 while the lid 28 is open so that the user has access to any food within the container or may add food to the container. The lid 28 moves out of engagement with the collar 26 and is moved to the open position to reveal the wide-mouth opening 36 of the container into which food items may be placed and from which food items may be taken. The opening 36 into the container includes a throat portion 38 that leads into the interior food storage space. The throat portion 38 is primarily within the collar 26. The lid 28 has a projection 40 on its inner surface that fits into the throat 38 of the container to provide insulation of the contents of food container at the lid 28 in addition to the insulation provided by the sidewalls of the container 22. The projection 40 on the lid 28 is shaped to fit snuggly into the throat 38 and may have a tapered, somewhat curved shape to avoid binding as the lid is pivoted between the open and closed positions.

The collar 26 has a latch receiving opening 42 at a top surface into which a catch projection 44 of the latch fits when the lid 28 is latched closed. The hinge 34 is formed by a hinge base 46 extending from the collar 26 at a position opposite the latch opening 42. In the illustrated view, the throat portion 38 has a small rounded projection 48 that extends toward the hinge 46 for engaging a spring cushion on the lid 28, as will be described. The small rounded projection 48 may extend into a similar shaped recess in the collar 26 at a position near the hinge.

Figure 4:
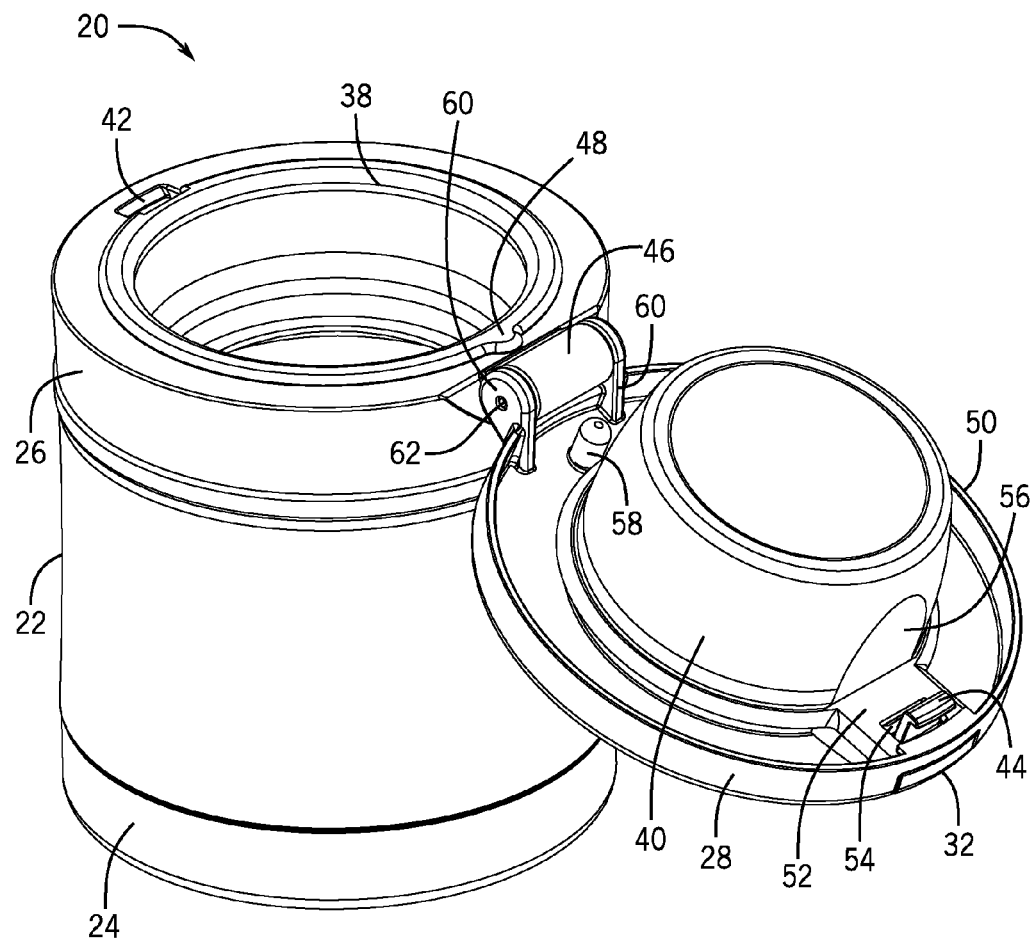
FIG. 4 is a rear perspective view of the food storage container and open lid showing a spring cushion and latch.

FIG. 4 provides a back view of the lid 28, showing the lid projection 40 in the center of a disc-shaped lid having a projecting rim 50 at the edge. The release button 32 includes a catch projection 44 extending from the lid 28 at an opening 54 in to button channel 52 that extends from the release button 32 to the central projection 40 of the lid 28. The opening 54 through which the catch projection 44 extends is large enough to permit sliding movement of the button 32 and the catch projection 44 between an engaged position and a disengaged position. The central projection 40 of the lid 28 includes a flattened surface 56 at the button channel 52 on the otherwise generally cylindrical central projection.

On the opposite side of the lid 28 from the release button 32 is a resilient lid lifting projection, or cushion spring 58. The lid lifting projection 58 is of a resilient material and bears against the rounded projection 48 of the throat portion 38 when the lid 28 is in the closed position. Adjacent the lid lifting projection 58 is the lid portion 60 of the hinge 34. The lid portion 60 of the hinge includes spaced hinge portions that are disposed on each side of the central hinge element or hinge base 46 that extends from the collar 26. An opening 62 for a hinge pin is provided through the hinge parts.

Figure 5:
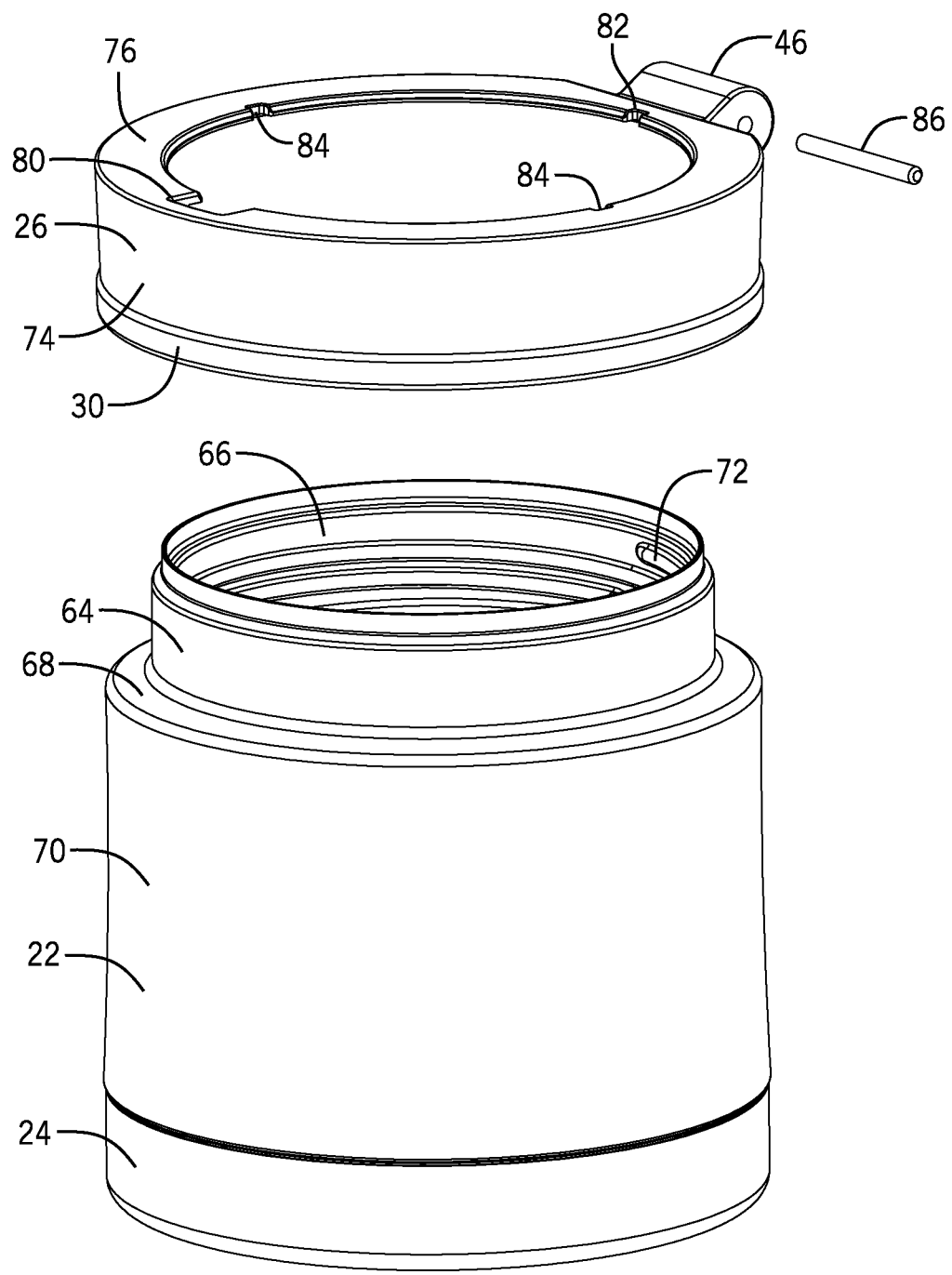
FIG. 5 is an exploded view of the base of the insulated food storage container and a lid engaging collar.

In FIG. 5, the base 24 and body 22 form an integral unit when used and are constructed to provide insulating properties to insulate food items therein from the surroundings. The body 22 may be vacuum insulated or insulated with an insulating material. The body has a lip 64 extending about a central opening 66 into the interior of the body 22. The lip 64 is set in from the cylindrical side wall 70 to form a ledge 68 and has a smooth outer surface. The interior surface 72 of the lip 64 is threaded. The threading 72 may extend into the body 22.

In the exploded view, the collar 26 is shown above the body 22. The collar 26 has a cylindrical outer surface 74 with the projecting ring 30 and a generally flat upper surface 76 with a central opening 78. The central opening 78 has a rectangular recess or notch 80 at the front for receiving the latch or catch projection 44, the rounded recess 82 at the back near the hinge base 46 for receiving the projection 48, and two additional recesses 84 on either side of the central opening 78. A hinge pin 86 is shown which extends through the center of the hinge parts when the container 20 and lid 28 are assembled with one another.

Figure 6:
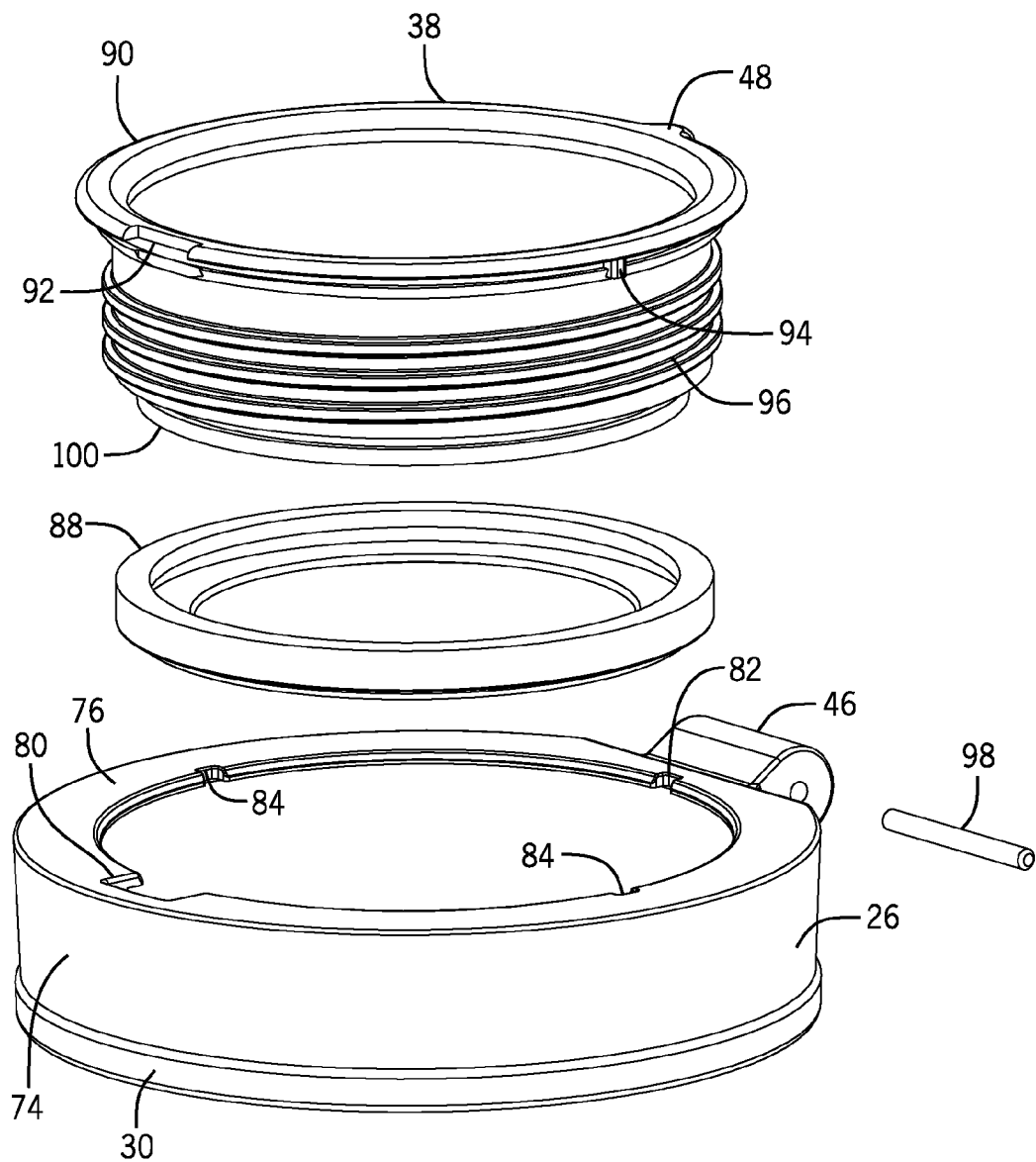
FIG. 6 is an exploded view of the lid engaging collar, a dual function gasket, and a collar insert.

Turning to FIG. 6, the collar 26 is also shown in this figure for the sake of illustrating the relationship between the collar 26, a gasket 88 and the throat portion 38. A single outer collar part 26 is provided on the food container 20. The throat portion or inner collar 38 has an upper ring 90 that extends onto the outer collar 26. The upper ring 90 has a rectangular cut-out or notch 92 to align with the rectangular cut-out or notch 80 in the collar 26 to thereby form the latch receiving opening 42. The upper ring 38 also has the rounded projection 48 opposite the square cut-out 92. On the underside of the upper ring 90 are provided projections 94 that extend into the recesses 84 extending from the central opening 78 of the collar 26. The projections 94 of the throat portion 38 engage into the recesses 84 in the collar 26 so that as the collar 26 is rotated, the throat portion 38 rotates with it, forming a rotational lock.

The exterior surface of the throat portion 38 is threaded at 96 to cooperatively thread into the interior of the body 22. The throat portion 38 is assembled into the body 22 by fitting the projections 94 of the throat portion 38 into the recesses 84 in the collar 26 and rotating the collar 26 while the throat portion 38 and body 22 are brought together so as to cause the threads of the body and throat to engage with one another. A hinge pin 98 is provided for the hinge 46. The hinge pin 98 fits into the hinge base 48 and provides pivoting movement with the hinge parts of the lid.

A lower end of the throat portion 38 has a flange 100 that is recessed inwardly from the threaded outer surface 96. The gasket 88 is mounted on the flange 100 by fitting a inner recess of the gasket 88 onto the outwardly projecting flange 100. The gasket 88 is positioned within the interior of the body 22 by being mounted on the flange 100 of the throat portion 38, the throat portion 38 being engaged on the collar 26, and the collar 26 and throat portion 38 being threaded onto the body 22 by rotating the collar 26 and the body 22 relative to one another.

Figure 7:
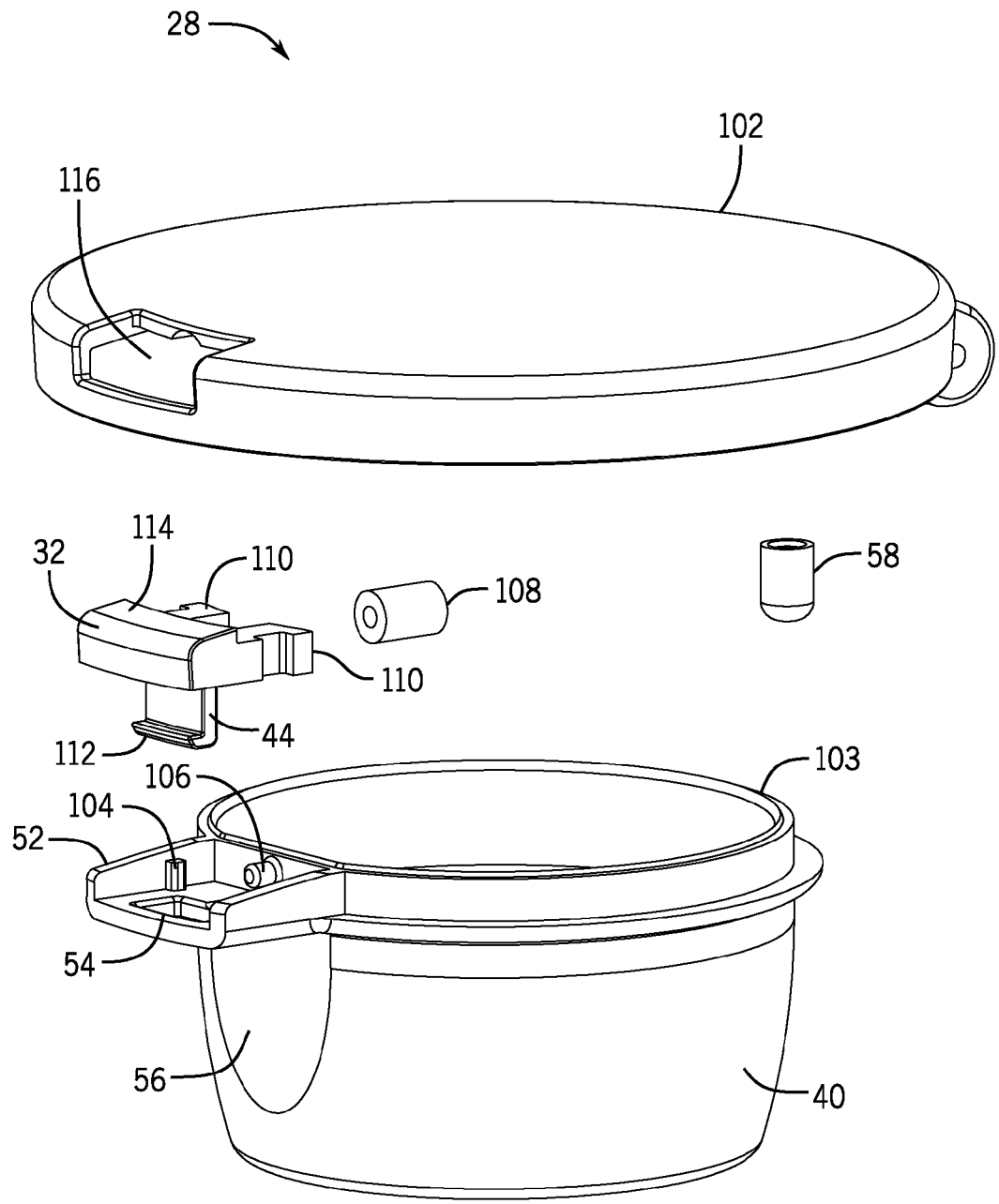
FIG. 7 is an exploded view of the lid showing the lid components.

FIG. 7 shows that the lid 28 is formed of an outer lid disc 102 and a central projection portion 40 that is fastened thereto. The lid disc 102 and projection portion 40 may be of plastic materials that are welded or glued together, such as by the rim 103 of the projection 40 engaging a corresponding feature on the lid disc 102. The central projection portion 40 has the latch channel or button channel 52 formed integrally therewith. The flattened surface 56 on the central projection 40 at the latch channel 52 may be provided for strength and/or may be an effect of the molding process, such as to enable the channel 52 to have sufficient length for movement of the button 32. The latch channel 52 includes the opening 54 through which the latch projection 44 extends, as well as including motion limiter projections 104 at opposite sides within the button channel 52 and a spring mounting projection 106 at the center back of the button channel 52. A spring 108, here shown as a short tube of resilient material such as rubber or other resilient material, is mounted onto the spring mounting projection 106 in the latch channel 52.

The latch piece or push button 32 is mounted in the latch channel 52 in a position to bear against the spring 108. Side wings or legs 110 of the latch piece or button 32 cooperate with the motion limiter projections 104 in the latch channel 52 to define a range of motion for the latch piece 32 within the channel 52. The latch projection 44 of the latch piece or button 32 extends through the opening 54 in the latch channel 52 and includes a catch nose 112 that engages the collar 26 when the lid 28 is in a closed and latched position. A button portion 114 of the latch piece 32 extends through an opening 116 in the lid disc 102 to form the release button. The latch piece 32 may be of the same material and color as the lid disc 102 or may be of a contrasting color and/or different material than the lid disc to ensure that the user recognizes the button 32 as distinct from the lid 28.

The lid lifting projection or cushion 58 is a short cylinder of resilient material with a domed end and a hollow at the end opposite the dome so that it may be mounted on a projection extending from the underside of the lid disc 102. The lid lifting projection 58 may be glued or otherwise secured onto the projection or may be press fit thereon.

Figure 8:
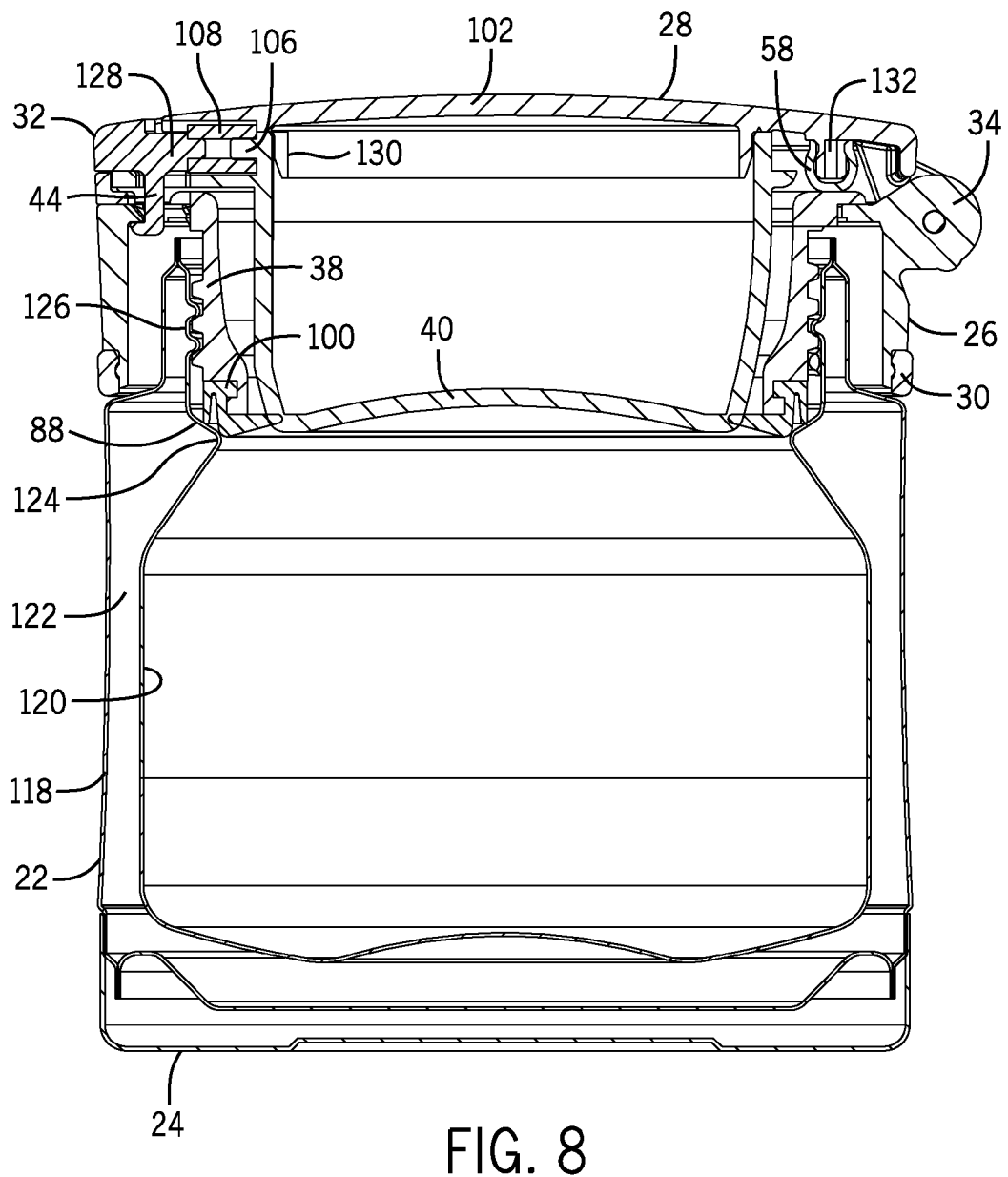
FIG. 8 is a cross sectional view of the present insulated food storage container with the latch in an engaged position.

With reference to FIG. 8, the body 22 has an exterior wall 118 and an interior wall 120 defining an insulating space 122 therebetween. The insulating space 122 may be filled with air, or an insulator, but in a preferred embodiment encloses a partial vacuum. The preferred body 22 is formed of two layers of stainless steel, although other materials may be used instead. The base 24 is secured onto the body 22 and may also be of stainless steel or may be of plastic, rubber, or other material.

The inner wall 120 of the body defines the food containing chamber. It is preferably smooth and shaped for easy cleaning without sharp corners or recesses. At the upper end of the food containing chamber 120 is an inwardly extending neck 124 formed in the inner wall. The gasket 88 bears against the neck 124 to form a seal between the throat 38 and body 22 at the neck 124 and prevent food from reaching the space between these parts. The gasket 88 of the illustrated embodiment has an outer sealing flange that engages the neck 124 to provide an improved seal.

Above the neck 124 in the interior wall is the interior threaded portion 126 of the body 22 that threadably engages the throat portion 38. The throat portion 38 has the lower flange 100 on which the gasket 88 is mounted. The upper end of the throat 38 has the upper ring 90 that projects onto the top 76 of the collar 26 a short distance to hold the collar 26 onto the body 22 when the throat 38 is threaded into the body 22. A second gasket or O-ring may be provided between the edge of the lip of the body and the throat to seal the space between the throat and the body from outside. The collar 26 has the ring 30 extending from the lower edge of the collar where it contacts the exterior surface of the body. The ring 30 may be formed of the same material as the collar 26 or may be of a different material, such as a decorative material.

The lid 28 in FIG. 8 is in the closed and latched position. The latch projection 44 extends into the opening in the collar 26 and engages the edge of the collar 26 as a strike so as keep the lid 28 in the closed position so long as the latch 32 is not released. The latch piece or button 32 is in the fully forward or latched position in the lid 28, flush with the cylindrical shape of the lid and collar. The spring 108, which is a tube of resilient material is fitted between the spring mounting projection 106 in the latch channel and a projection 128 on the back of the latch piece or button 32, urges the latch piece to the fully forward or latched position. Sliding movement of the latch piece or button 32 by a user toward the release position compresses the spring 106, overcoming the resilient force that maintains the latch piece 32 toward the fully forward, latched position.

The inside surface of the lid disc 102 includes a ring-shaped projection 130 over which the central projection 40 is mounted. The central projection 40 extends into the throat of the throat portion 32 and into contact with the gasket 88 mounted on the throat portion 38. The gasket 88 has two gasket surfaces formed by flanges extending in different directions (i.e. outwardly and inwardly) so that the gasket 88 simultaneously forms a seal between the throat portion 38 and the body 22 as well as forming a seal between the throat portion 38 and the central projection 40 of the lid 26. By providing a single gasket 88 having a dual function, the food items within the food containing compartment are prevented from leaking into spaces between the body and throat, on one hand, and between the throat and lid, on the other hand.

The underside or inside of the lid disc 102 has a projection 132 onto which is mounted the lid lifting projection 58. The resilient lid lifting projection 58 is compressed against the body of the food container when the lid 28 is in the closed position. In particular, the lid lifting projection 58 is compressed against the rounded projection 48 of the throat portion 38. The compression of the resilient lid lifting projection 58 exerts an opening force between the lid 28 and the body 22. The opening force is exerted near the hinge 34.

Figure 9:
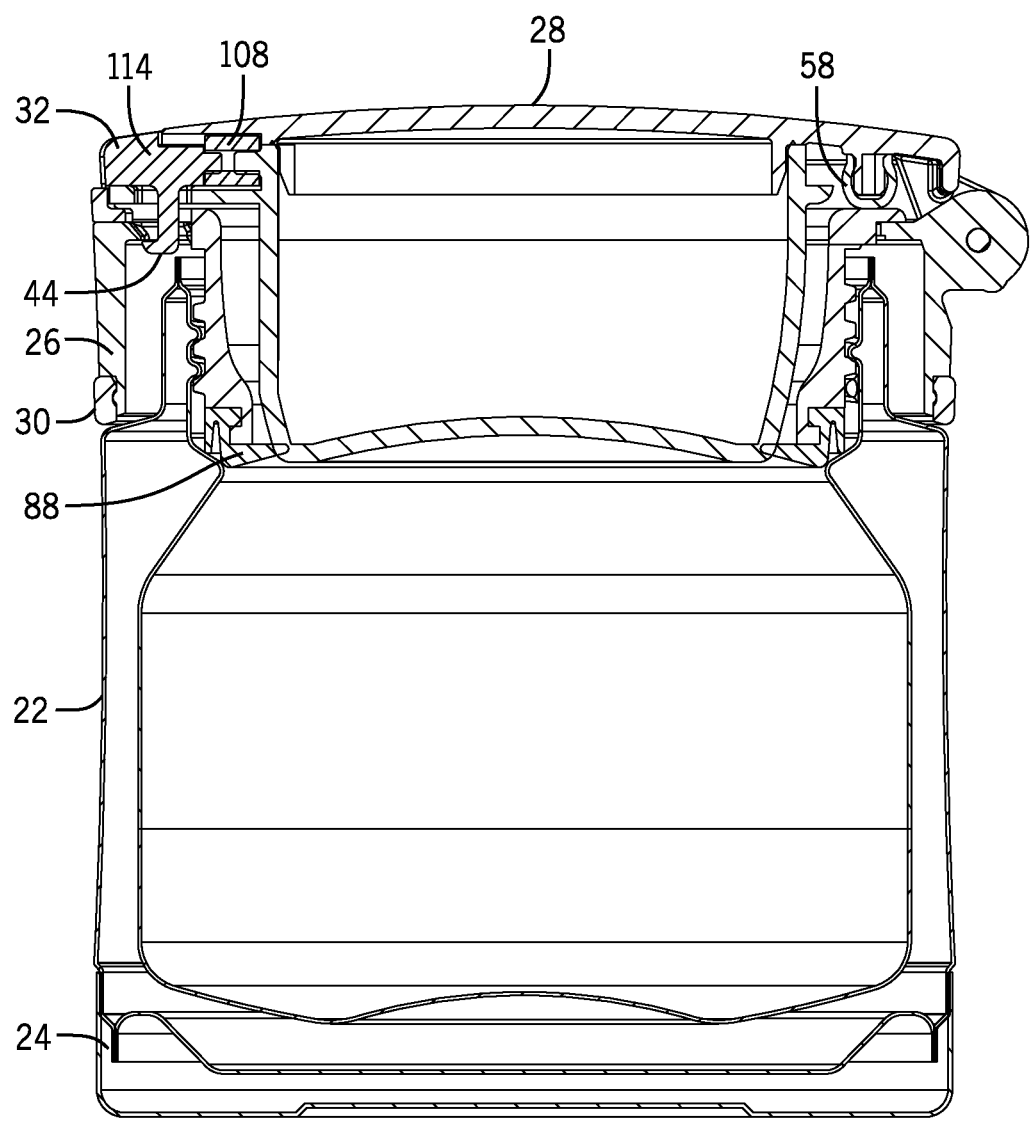
FIG. 9 is a cross sectional view similar to FIG. 8 except that the button release is in the disengaged position.

FIG. 9 shows the release button 32 in a release position, as shown in FIG. 2. The latch piece 32 has been slid in the latch channel 52 by pressing on the forwardly projecting button portion 114 to compress the spring 108. The movement of the latch piece has moved the latch projection 44 out of engagement with the collar 26. Continued force on the release button 32 is required to maintain the illustrated position, because otherwise the compressed spring 108 would cause the latch piece 32 to move back to the latched position.

The illustration of FIG. 9 represents only a momentary position, because releasing the latch 32 causes the compressed lid lifting projection 58 to exert an opening force on the lid 28 and move it out of the latched position. In the preferred embodiment, the release of the latch 32 causes the lid 28 to "pop" to a slightly open position as the force of the compressed lid lifting projection 58 is released. In the slightly open position, the latch projection 44 can no longer engage the collar opening so that the lid does not re-latch. The user may then open the lid to the fully open position to add food items to the container or remove food items from the container. The lifting of the lid 28 to the slightly open position enables the user to release the latched lid to an open position with one hand. A user with limited dexterity can thereby easily open the container.

The insulated food storage container 20 is closed as easily. After placing food items into the container, the lid 28 is pivoted toward the closed position. Without exerting a closing force on the lid 28, the lid 28 remains in the un-latched position as a result of the lid lifting projection 58. By exerting a closing force on the lid 28 to compress the lid lifting projection 58, a tapered edge 112 of the latch projection 44 slides on the strike of the collar 26, which may also have a tapered edge, to move the latch member 32 briefly toward the release position. After the downward force on the lid 28 causes the catch nose 112 on the latch projection 44 to clear the collar edge, the compression on the spring 108 urges the latch member 32 back to the latched position. The catch nose 112 of the latch projection 44 is engaged with the collar 26 and the lid 28 is thereby latched closed. The closed position of the lid 28 compresses the inner portion of the gasket 88 against the central projection 40 of the lid 28.

Figure 10:
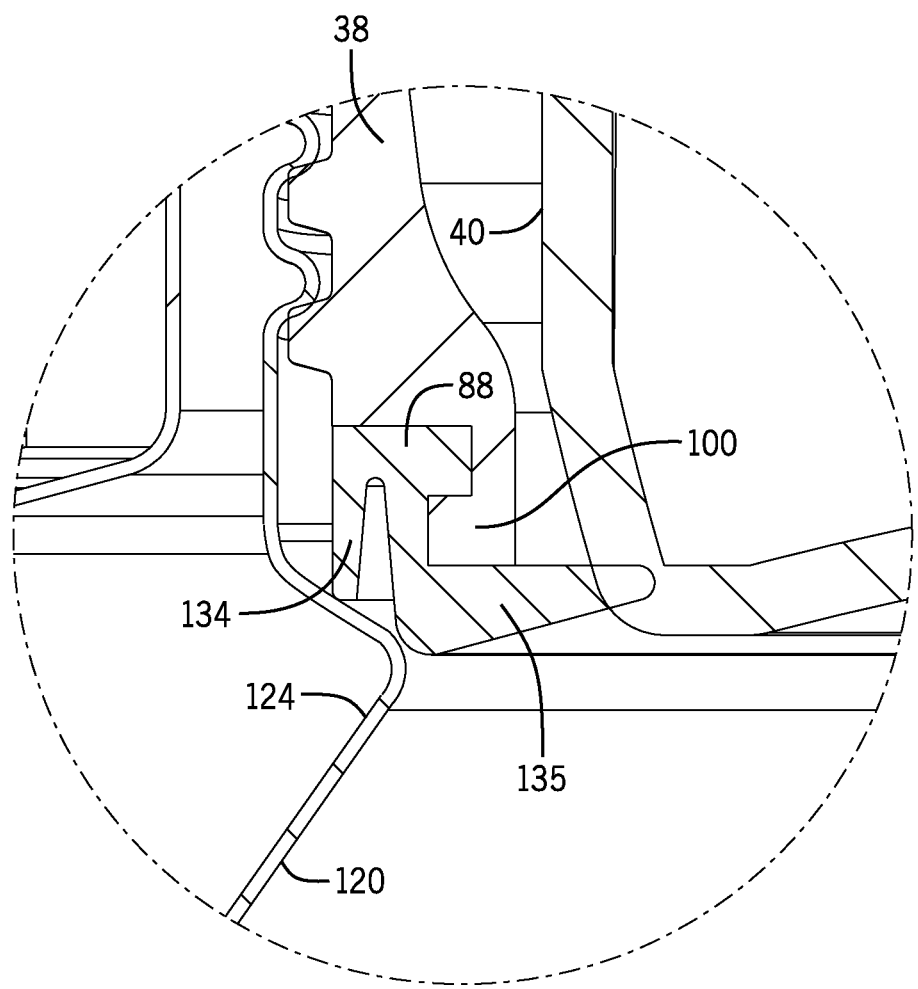
FIG. 10 is an enlarged fragmentary view of the dual function gasket of the present food storage container.

In the enlarged view of FIG. 10, the gasket 88 is shown mounted on the lower flange 100 of the throat portion 38. The gasket 88 has an outwardly projecting membrane 134 that bears against the neck 124 of the inner wall 120 of the body 22 to form a seal to prevent food items and liquids from escaping into the space between the throat portion 38 and the body 22. The gasket 88 has an inwardly projecting membrane 135 that contacts the central projection 40 of the lid 28 to provide a seal between the throat portion 38 and the lid 28 at the neck of the container. Food items are thereby kept in the food containing central cavity of the container and leaks are prevented by the gasket 88. The gasket 88 is shown in the drawings in its non-contacted state, although the neck 124 and the inner projection 40 are shown in contact with the gasket 88. The membranes 134 and 135 of the gasket 88 will deform when in contact with the neck and inner projection in the device.

Figure 11:
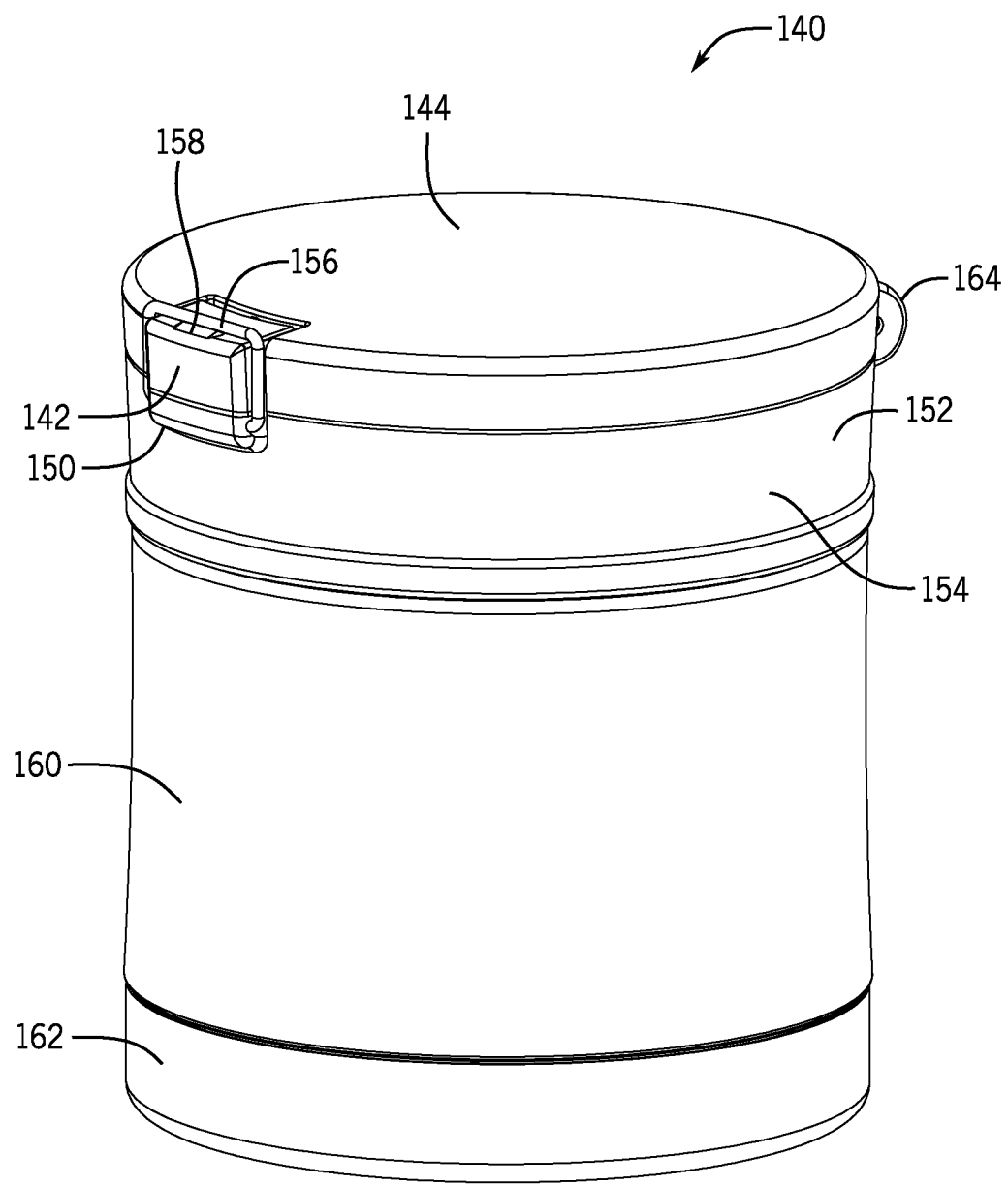
FIG. 11 is a side perspective view of a second embodiment of the food container according to the principles of the present invention and including a securing latch.

A second embodiment of a food container 140 is provided as disclosed in FIG. 11 through 18. In the second embodiment as shown in FIG. 11, the food container 140 has the same basic structure as the food container of the first embodiment with the exception of the latch. A latch 142 which secures a lid 144 in a closed position and which permits the user to open the lid 144 to access the contents of the container 140 or to add food to the container 140 is, in the second embodiment, configured to extend from the lid 144. A push button 146 of the latch 142 extends outward beyond the cylindrical wall 148 of the lid 144 whereas the push button of the first embodiment forms a continuous part of the cylindrical wall of the lid. A projecting portion 150 is also provided on the cylindrical wall 152 of a collar 154 below the latch. A wire loop 156 extends from the projecting portion 150 of the collar 154 and over the projecting portion of the push button 146. A raised rib 158 on the top of the push button 142 engages the wire loop 156. With the wire loop 156 in the engaged position as shown, the push button 142 of the latch is prevented from being pushed inward so that the latch is prevented from being inadvertently released. Accidental spills are thereby prevented.

In addition to preventing the button 142 from being pressed inward, the wire loop 156 holds the lid 144 in the closed position by extending from the collar 154 of the food jar to the lid 144. If the latch 142 is not securely latched, the wire loop 156 provides an additional measure that holds the lid closed. So, for example, should food become trapped in the latch to prevent its full engagement or should the user fail to press the lid 144 into the fully closed position resulting in the latch remaining disengaged or being only partially engaged. Even if the button 142 is pressed sufficiently to release the latch while the wire loop 156 is in place, the wire loop 156 will hold the lid 144 closed.

The wire loop 156 may be made of metal, plastic or other materials and may be of a variety of shapes and mounted in different locations and by different means than illustrated, yet is within the scope of the invention. The wire loop may be referred to as an engaging member.

As such, accidental spills of the food within the food jar are prevented even if the food jar is jostled around in a lunch bag or bumped during handling, or the lid was not initially closed in a fully latched condition.

The food jar 140 also has a body 160 and a base 162. A hinge 164 connects the lid 144 to the collar 154. Any components not described in detail in this embodiment may be substantially the same as those of the previously described embodiment.

Figure 12:
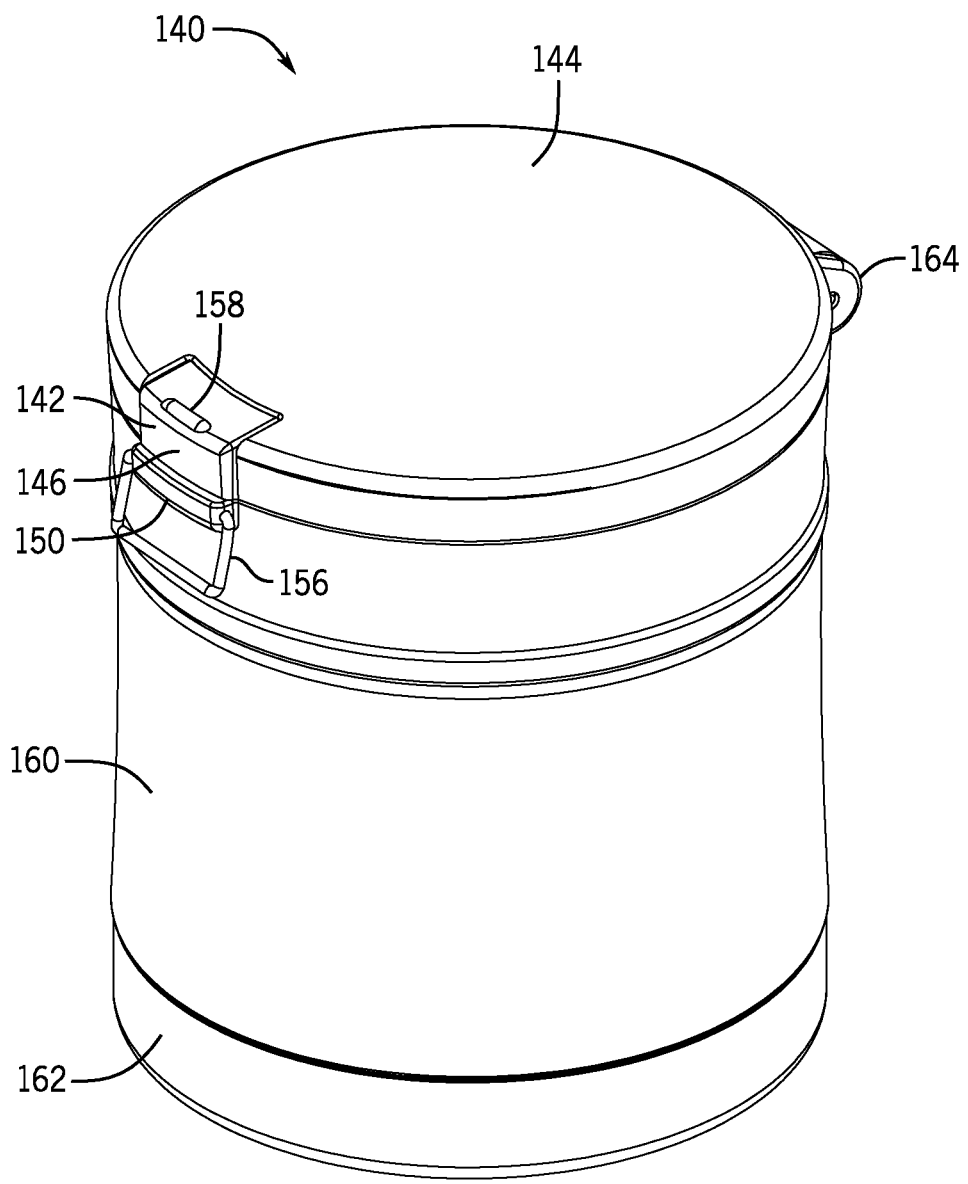
FIG. 12 is a to perspective view of the second embodiment showing as securing latch in an open position.

In FIG. 12, the wire loop 156 has been moved to the release position. At this position, the wire loop 156 is still held in the projection 150 from the collar 154 of the food jar body 160 but no longer engages the push button 142 on the lid 144. The wire loop 156 is able to rotate between the engaged position and the release position as a result of the ends of the wire loop 156 pivoting in openings in the projection 150 from the collar 154. The projection or rib 158 at the top edge of the button 146 is seen. The projection or rib 158 holds the wire loop 156 in the engaged position when the user snaps the wire loop 156 over the projection 158 when moving the wire loop 156 onto the button 146. The wire loop 156 is moved to the release position by the user snapping the wire off the button 146.

The wire loop 156 not only performs the function of (1) holding the lid closed and (2) preventing the button from being inadvertently pressed, but also performs a function of (3) ensuring full closure of the lid, and (4) urging the button to the fully latched position. Should the user press the lid 144 closed, but fail to bring the lid 144 to a fully closed position, the act of securing the wire loop 156 onto the button 146 will provide the additional downward force to force the lid to the fully closed position. If the lid 144 has been closed by the user, but the latch button 142 has not moved to the fully latched position, the act of snapping the wire loop 156 over the projection 158 on the button 146 and the resulting force of the wire loop 156 pulling with both a downward and outward force on the depressed button will pull the button 146 toward the extended position. The forces exerted by the wire loop 156 on the button 146 and lid 144 press the lid into the fully seated, closed position, and enable the latch 142 to complete its motion to the fully latched position. When the user snaps the wire loop 156 over the projection 158 on the button 146, the lid 144 is fully closed and sealed and the button 142 is fully latched.

In the position shown in FIG. 12, the lid 144 is still latched in the closed position. The push button 146 is in the outwardly extended position, indicating that the catch 142 operated by the button 146 is in the engaged position. To release the latch 142 and open the lid 144, the user presses inward on the push button 146. The pushing force is directed in a radial direction relative to the cylindrical lid and jar body.

Figure 13:
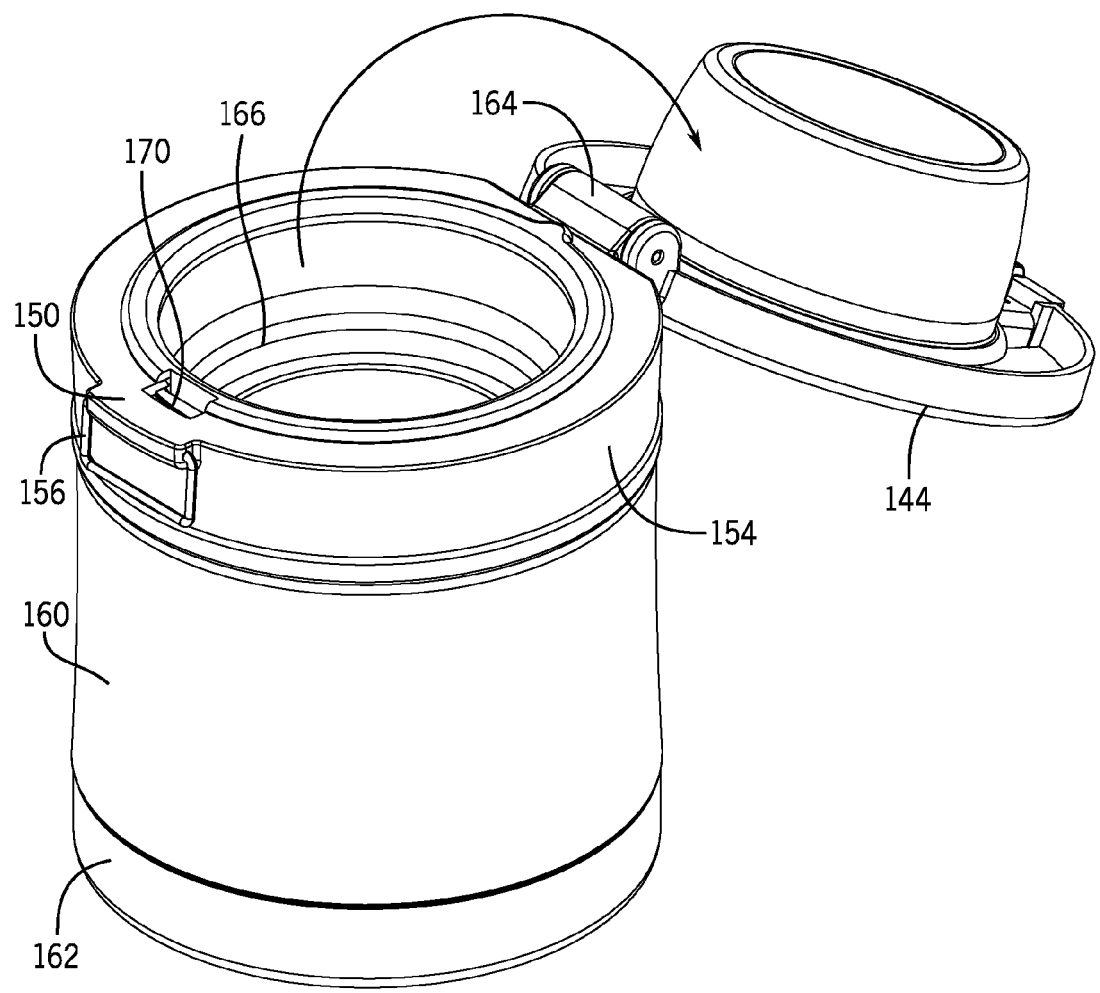
FIG. 13 is a top perspective view of the second embodiment showing the lid in an open position.

FIG. 13 shows the food jar 140 after the button 146 has been pressed so that the lid 144 can be moved to the open position. Food within the jar 140 is accessible through the opening 166 at the top of the jar 140 or food can be placed into the open jar 140. The lid 144 moves to the fully open position by pivoting of the hinge 164 so that the lid does not interfere with adding or removing food. The hinge 164 keeps the lid 144 attached to the jar 140 so that it does not get misplaced and so that it does not become soiled from being set onto a surface. The insulated extension 168 at the center of the lid 144 can be seen, which extends into the opening 166 to insulate and seal the food in the food jar when the lid 144 is in the closed position.

The top edge of the food jar 140 includes the projection 150 that holds the wire loop 156. The wire loop 156 in this view is pivoted to lie against the body of the food jar so that it is also out of the way when adding or removing food. The collar or rim 154 of the food jar 140 also includes an opening 170 for receiving a catch projection of the latch 140 when the lid 144 is closed.

Figure 14:
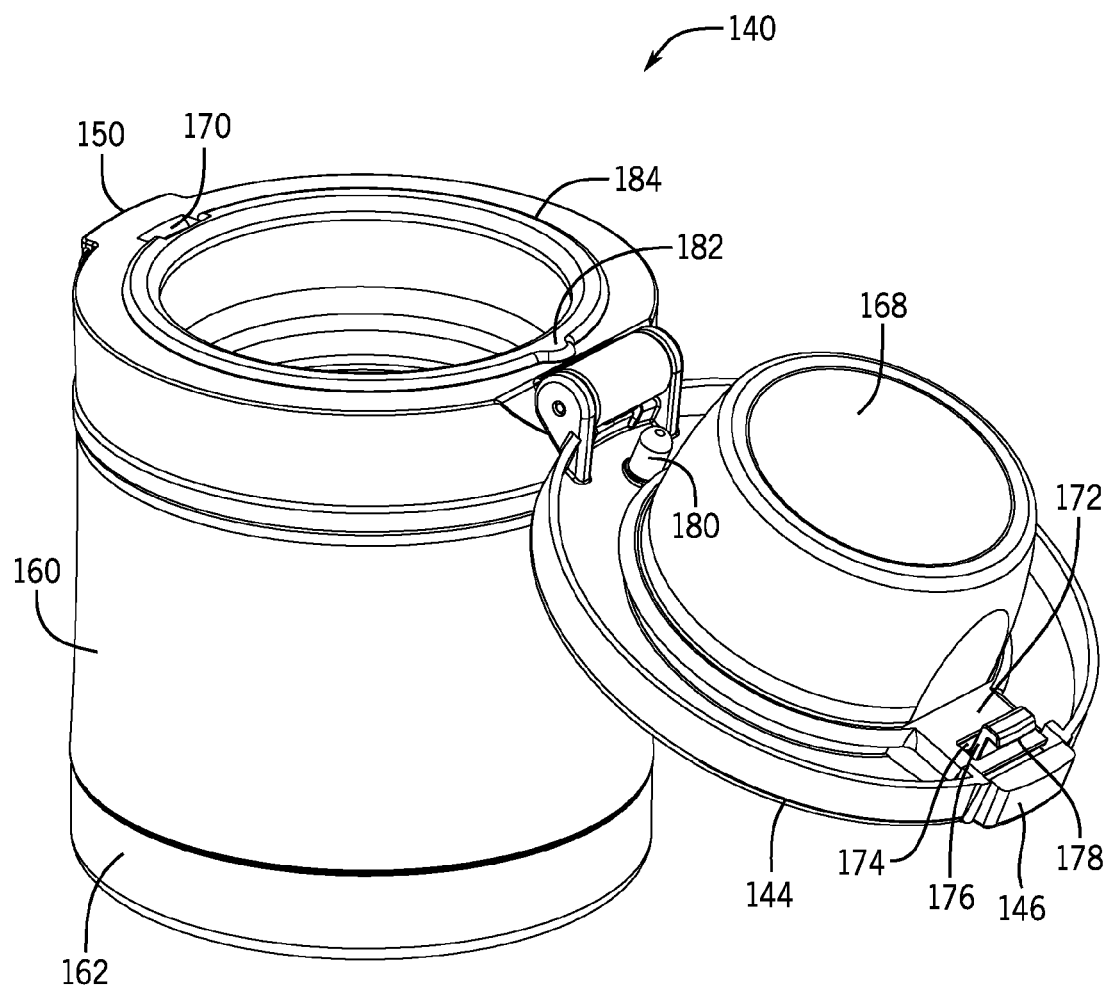
FIG. 14 is a back perspective view of the food container with the lid in the open position.

FIG. 14 shows another view of the open food jar 140 with the lid 144 in the fully open position. The lid 144 has the push button 146 extending from the cylindrical surface. The extent of the projection is sufficient that the wire loop 156 can engage the projection. The push button 146 is mounted for sliding movement in as button channel 172 in the lid 144. The button channel 172 has an opening 174 through which extends a catch projection 176. The catch projection 176 extends into the opening 166 in the collar or rim 154 of the food jar to engage the rim of the food jar and hold the lid 144 in the closed position when engaged. The catch projection 176 has a catch nose 178 that engages an edge or strike within the opening 166 when the button 146 and catch projection 176 are in the latch position.

A spring cushion 180 is provided on the lid 144 at a position opposite the push button 146. The spring cushion 180 engages an extension 182 of the inner rim 184 of the food jar when the lid 144 is closed so as to bias the lid 144 to the open position. When the latch 142 is released, the compressible spring cushion 180 pushes the lid 144 open from the fully closed position. Release of the latch 142 results in the lid 144 popping to at least a slightly open position as a result of the compressed spring cushion 180 being released from its compressed condition.

Figure 15:
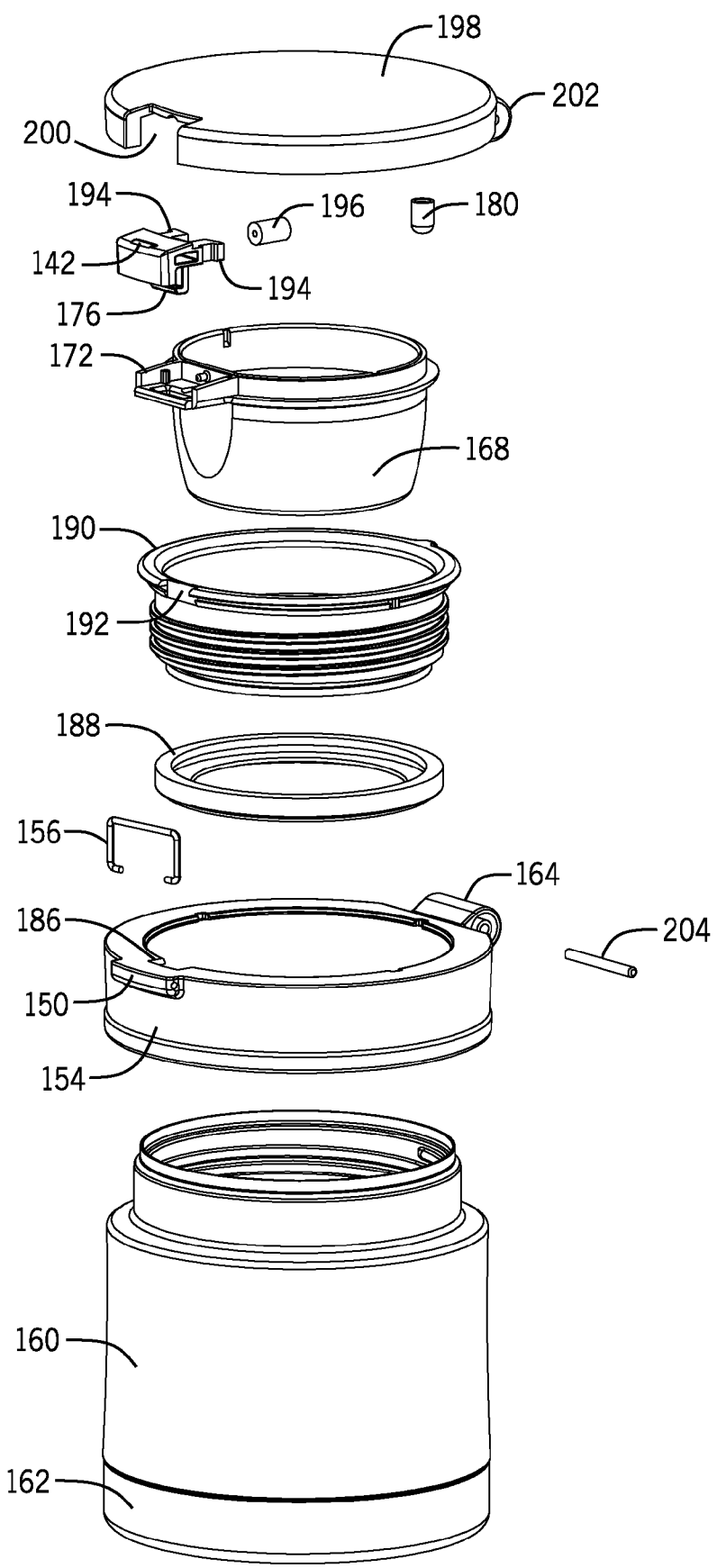
FIG. 15 is an exploded view of the food container of the second embodiment.

FIG. 15 illustrates the parts the make up the insulated food jar 140 of the second embodiment. The body 160 is preferably of a vacuum insulated metal having a double walled construction. A base 162 may be provided on the insulated body 160 of the food jar, such as a plastic base to provide a surface on which to stand the jar. The collar or rim 154 of the food jar includes the projection 150 for holding the wire loop 156; the collar 154 also includes a projection 164 as a portion of the hinge. The collar or rim piece 154 has a notch 186 where the opening for the catch projection 176 extends when the lid 144 is closed. The wire loop 156 is seen just above the projection 150 into which it fits. The opposite ends of the wire loop 156 extend into openings on opposite sides of the projection 150.

A gasket 188 is shown above the collar 154, and above that is an inner collar or throat 190 that is threaded into the insulated body 160 to hold the gasket 188 and collar 154 in place. A notch 192 on the inner collar 190 aligns with the notch 186 on the collar 154 to form the latch opening 166.

The lid components include the central projection 168 that also includes the button channel 172. The central projection 168 provides an insulated air space for insulating the contents of the food jar. The button body 142 is mounted in the button channel 172 so as to slide between a latched position and a release position. Legs 194 extending from the back of the button body 142 include feet that engage projections within the button channel 172 to prevent the button from moving out of the button channel. The catch projection 176 extends from the button body 142 through the opening in the button channel 172. A compressible spring 196, such as a section of rubber tube, is mounted between the legs 194 of the button body 142 and extends into contact with a back wall of the button channel 172 to bias the button 142 to a latch position. Pressing on the button 146 exerts force on the compressible spring 196 as the button is moved to the release position.

The spring cushion 180 at the back of the lid 144 is shown as a cylindrical compressible member that is mounted to the lid. The lid 144 also includes a cover or disk 198 to which the central projection 168 is mounted. The cover 198 closes the button channel 172 from above except for an opening 200 through which the button 146 extends. The cover 144 also includes a complimentary part 202 of the hinge that connects the lid 144 to the food jar body. A hinge pin 204 may be provided to connect the hinge parts to one another.

Figure 16:
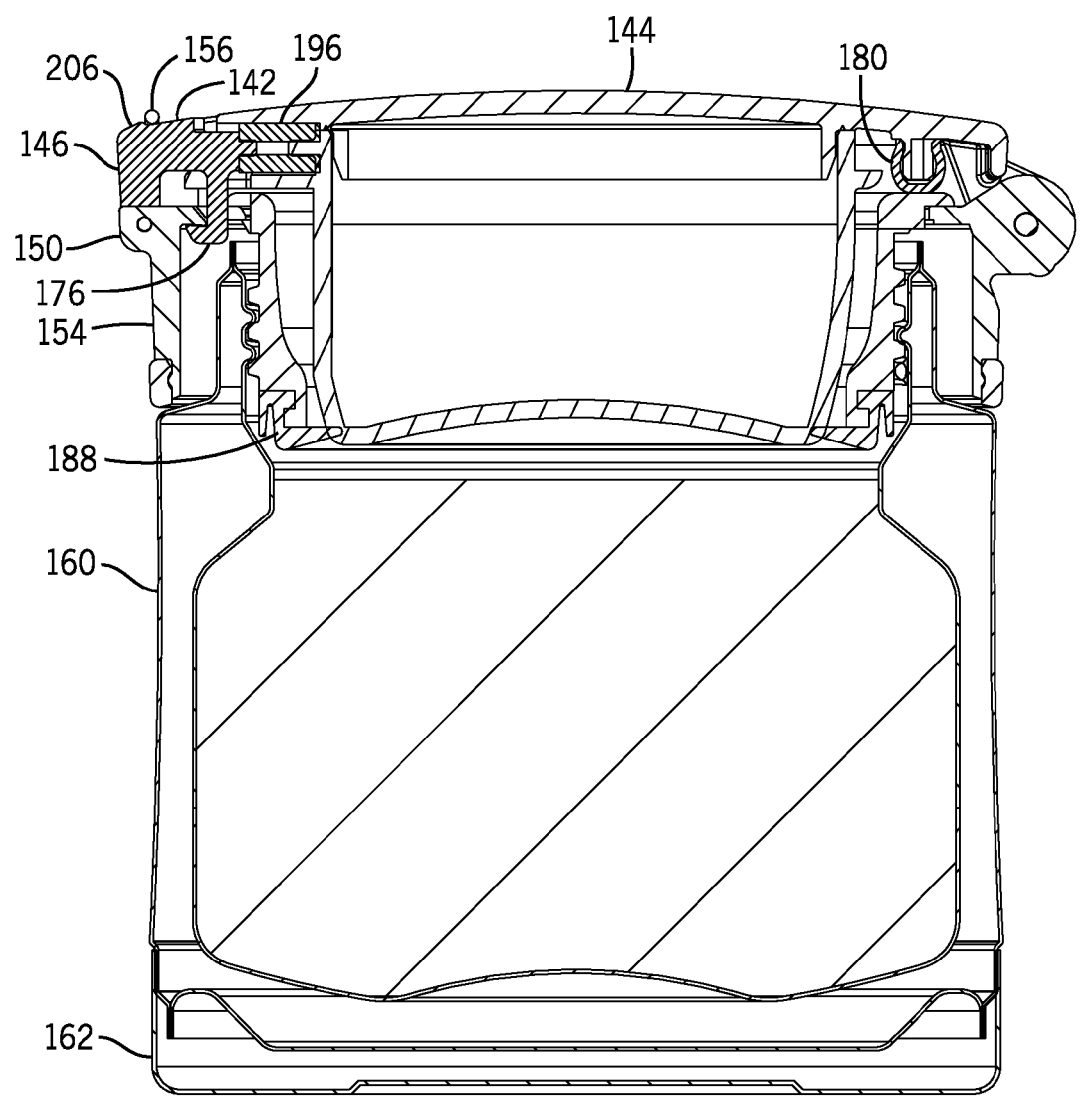
FIG. 16 is a cross-sectional view through the food container of the second embodiment showing the securing latch in the latched position.

A cross-sectional view of the food jar 140 in the closed condition is shown in FIG. 16. The button 146 is in the latch position, fully extended from the lid 144 by the action of the compressible spring 196. The lid 144 is in the closed position in the jar body. As a result of the button and lid positions, the catch projection 176 on the button latch 142 engages the rim within the catch opening, which holds the lid 144 in the closed position. To ensure that the lid 144 is held in the closed position, the wire loop 156 is in position over the top of the button 146. The wire loop 156 extends from the projection 150 on the jar body to the position over the button 146 to prevent the lid 144 from moving to an open position. Security is thereby provided by the wire loop 156 in conjunction with the button 146 and projection 150 shapes to prevent soup or other foods from spilling out of the food jar during transport, for example.

The position of the wire loop 156 on the button 146 in conjunction with the ridge 206 on the top of the button 146 prevents the button from being pushed inwardly. In other words, the wire loop 156 prevents button movement in addition to securing the lid closed. Both functions are performed by the structure of the wire loop 156 and button 146. As noted above, additional functions may be performed by the structure as well.

As noted above, the closed position of the lid 144 maintains a seal with a gasket 188 within the thud jar to prevent food leakage. The spring cushion 180 at the back of the lid is shown in the compressed state, from which it will spring when the latch 142 is released. The double walled construction of the food jar 160 and the lid 144 provide insulation against warming of cooled foods and cooling of warmed foods while stored in the food jar. The double walled construction may enclose a partial vacuum, air, or an insulating material such as expanded foam or other material. The bottom portion 162 added onto the body of the food jar is apparent in the cross section.

Figure 17:
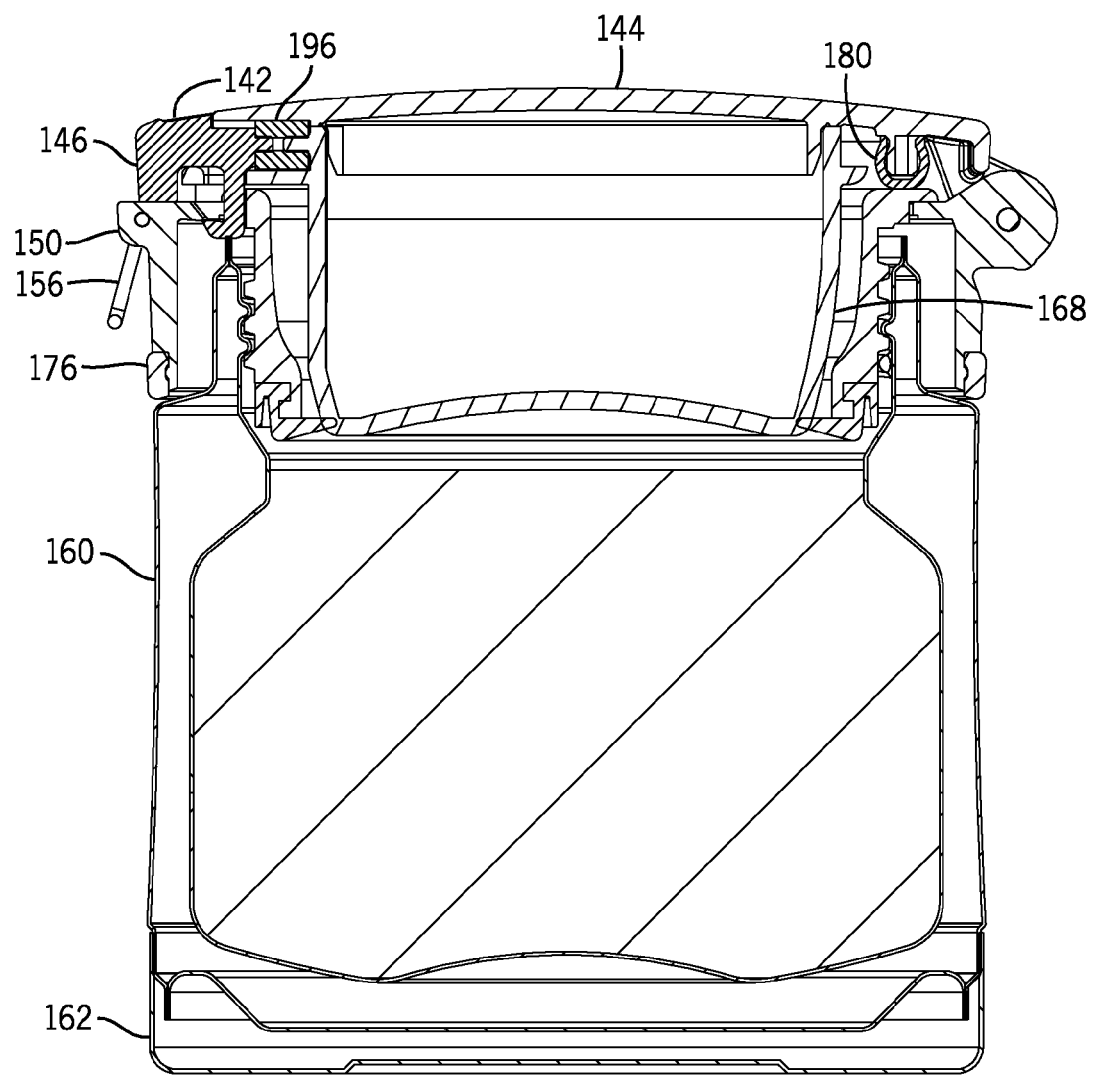
FIG. 17 is a cross-sectional view of the food container of the second embodiment showing the securing latch in the unlatched position and the button release in the released position.

FIG. 17 shows the wire loop 136 in the disengaged position, where it has been unsnapped from the top of the button 146 and permitted to pivot to a position away from the button. The disengaged position of the wire loop 136 is any position where the wire loop 156 is not engaged on the button 146. Also in this view, the button 146 has been pressed inwardly toward the center of the lid 144. The resulting sliding movement of the button latch 142 in the button channel compresses the tube-shaped spring 196 that acts on the button. When sufficient sliding movement of the button latch 142 has occurred, the catch projection 176 of the button disengages from the rim of the food jar. The drawing of FIG. 17 thus shows the insulated food jar in an unstable position, since the lid 144 will spring open when the button 146 is pressed inwardly sufficiently to release the hitch. The springing open of the lid is primarily as a result of the cushion spring 180 between the lid and the rim of the food jar, but the gasket 188 pressing on the central projection of the lid may also exert an opening force on the lid as the latch is released.

It is foreseen that the wire loop may be pivotally mounted on the button and when engaged extend over the projection extending from the collar in some embodiments. The body of the food jar need not be insulated in ever embodiment.

Figure 18:
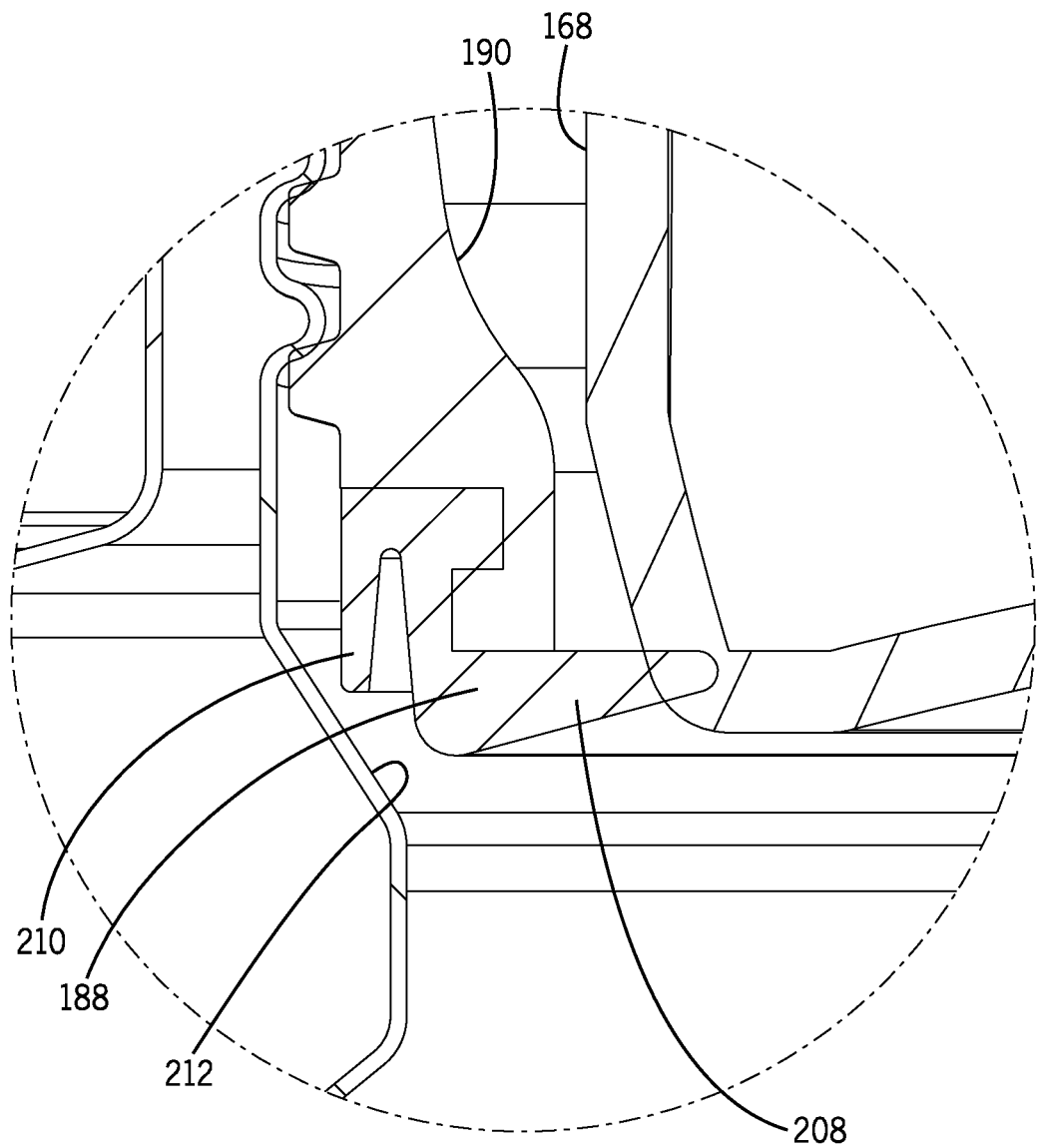
FIG. 18 is an enlarged fragmentary cross-sectional view of a seal in the second embodiment.

The gasket 188 on the inner sleeve 190 of the food jar is shown in greater detail in FIG. 18. The gasket 180 has two portions, a first portion 20 that forms a seal between the inner sleeve 190 and the projection 168 of the lid and a second portion 210 that forms a seal between the inner sleeve 190 and a neck portion 212 the double walled body 160 of the food jar body. Leakage of food from the food jar is thereby prevented.

Thus, there is shown and described a food jar that has an easy-to-open wide mouth lid that provides easy access to food within the food jar. One-handed opening and closing of the food jar is possible. Use of the food jar by those with dexterity issues, such as users with arthritis, or by younger users or those with smaller hands, is possible. Secure closure is ensured by the latching button. Additional security is provided by the wire loop, as a safety feature against spilling of hot food, for example. The wire loop of the illustrated embodiment not only holds the lid closed, but also prevents the button from being pressed in to release the latch, and insures that the lid is fully closed and that the button is fully latched. The addition of the wire loop and the cooperating structure of the projecting button in the preferred embodiment provides these multiple functions.

Although other modifications and changes may be suggested by those skilled in the art, it is the intention of the inventors to embody within the patent warranted hereon all changes and modifications as reasonably and properly come within the scope of their contribution to the art.

I claim:

1. A food container, comprising:
    a container body having a generally cylindrical wall and defining an interior space;
    a collar affixed to the container body;
    a lid selectively securable in a closed position to close the interior space of the container body and movable into an open position to uncover the interior space of the container body, the lid including a central projection positioned to extend into an opening in the container body when the lid is in a closed position, the central projection having a curved shape to avoid binding as the lid is pivoted between the closed position and the open position;
    a hinge pivotally connecting the lid to the collar;
    a latch operable between an engaged position and a released position, the latch being mounted in the lid, the engaged position of the latch engaging the collar;
    a throat portion having an upper end and a lower end, the upper end mounted in the collar and the lower end extending into the container body; and
    a gasket mounted at the lower end of the throat portion, wherein the gasket includes a first gasket membrane extending from the throat portion outwardly into contact with the container body to form a sealing contact between the throat portion and the container body, and a second gasket membrane extending from the throat portion inwardly into contact with the lower end of the central projection of the lid when the lid is in a closed position to form a seal between the throat portion and the lid when the lid is in the closed position.

2. A food container as claimed in claim 1, wherein the gasket surrounds the opening to the interior space of the container.

3. A food container as claimed in claim 1, wherein said latch includes an outwardly projecting portion extending from said lid when said latch is in the engaged position, and further comprising:
    an engaging member extending from said collar and being selectively positionable in an engaged position on the outwardly projecting portion of the latch.

4. A food container as claimed in claim 3, wherein said outwardly projecting portion of said latch is a button that is movable between a latch position and a release position, said engaging member being engagable on the button when the button is in the latch position, the engaging member restricting movement of the button to the release position and holding said lid in a closed position on the container body when the engaging member is engaged on the button.

5. A food container as claimed in claim 4, wherein said engaging member is a wire loop.

6. A food container as claimed in claim 1, wherein the throat portion includes an exterior threaded surface; and
    wherein the container body includes an interior threaded surface engaged with the exterior threaded surface of the throat portion.

7. A food container as claimed in claim 1, wherein the throat portion includes at least one projection extending into a recess in the collar to rotationally lock the throat portion with the collar.

8. A food container as claimed in claim 1, further comprising:
    an elastomeric member mounted between the collar and the lid when the lid is in a closed position to bias the lid away from a fully closed position so that the lid moves toward an open position upon release of the latch.

9. A food container as claimed in claim 8, further comprising:
    a rim on the throat portion engaging the collar, a projection extending from the rim into a recess in the collar, the projection forming a surface for engagement with the elastomeric member when the lid is closed.

10. A food container as claimed in claim 1, further comprising:
    a button tunnel on the lid, the button tunnel enclosing portions of the latch and interior space within which the latch slidably moves between the engaged position and the released position.

11. A food container as claimed in claim 10, further comprising:
    first and second latch legs extending from the latch, latch leg engaging structures within the button tunnel to engage the first and second latch legs; and
    a spring mounted between the first and second latch legs to bias the latch toward the engaged position.

12. A food container as claimed in claim 10, wherein the button tunnel is formed as a unitary member with a central projection of the lid, the central projection being mounted to a lid cover to form the lid.

13. A food container as claimed in claim 1, wherein the latch includes a latch projection extending into a latch opening to engage the collar, the latch opening being defined by a notch in the collar and a notch in the throat portion.

* * * * *